US006833207B2

United States Patent
Joos et al.

(10) Patent No.: US 6,833,207 B2
(45) Date of Patent: Dec. 21, 2004

(54) UNITIZED REGENERATIVE FUEL CELL WITH BIFUNCTIONAL FUEL CELL HUMIDIFIER AND WATER ELECTROLYZER

(75) Inventors: Nathanial Ian Joos, Toronto (CA); David Frank, Scarborough (CA); Joseph Cargnelli, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 172 days.

(21) Appl. No.: 09/986,635

(22) Filed: Nov. 9, 2001

(65) Prior Publication Data

US 2003/0091880 A1 May 15, 2003

(51) Int. Cl.[7] .............................................. H01M 8/18
(52) U.S. Cl. ......................... 429/19; 429/13; 429/17; 204/DIG. 4
(58) Field of Search ..................... 204/DIG. 4; 429/13, 429/17, 19

(56) References Cited

U.S. PATENT DOCUMENTS

| | | | |
|---|---|---|---|
| 4,839,247 A | * 6/1989 | Levy et al. | .................. 429/21 |
| 5,376,470 A | 12/1994 | Sprouse | |
| 5,506,066 A | 4/1996 | Sprouse | |
| 6,503,648 B1 | * 1/2003 | Wang | ........................ 429/21 |

* cited by examiner

Primary Examiner—Carol Chaney
(74) Attorney, Agent, or Firm—Bereskin & Parr

(57) ABSTRACT

A regenerative fuel cell system, comprising an electrolyzer portion and a fuel cell portion; the electrolyzer portion has a closeable hydrogen inlet and a hydrogen outlet in communication with the cathode of the electrolyzer portion for conducting hydrogen, a gas bypass having a gas bypass inlet and a gas bypass outlet for conducting oxidant gas for fuel cell reaction to the fuel cell portion, a water inlet and an oxygen-water outlet for exhausting oxygen generated in electrolyzer operation and coolant water from the fuel cell portion out of the electrolyzer portion; the fuel cell portion has a hydrogen inlet, a first closeable hydrogen outlet for exhausting excess hydrogen in fuel cell mode, a second closeable hydrogen outlet for exhausting hydrogen generated in the electrolyzer portion in electrolyzer mode, an oxidant gas inlet, an oxidant gas outlet, a coolant water inlet and a coolant water outlet; and the hydrogen inlet of the fuel cell portion being in communication with the hydrogen outlet of the electrolyzer portion; the oxidant gas inlet of the fuel cell portion being in communication with the gas bypass outlet of the electrolyzer portion; and the water inlet of the electrolyzer portion being in communication with the coolant water outlet of the fuel cell portion.

28 Claims, 8 Drawing Sheets

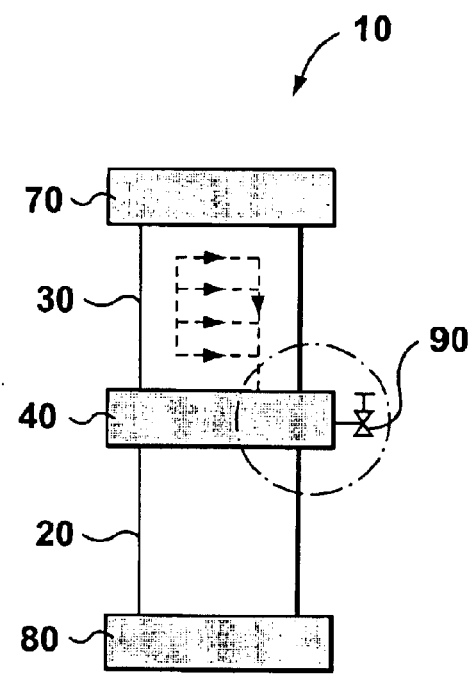
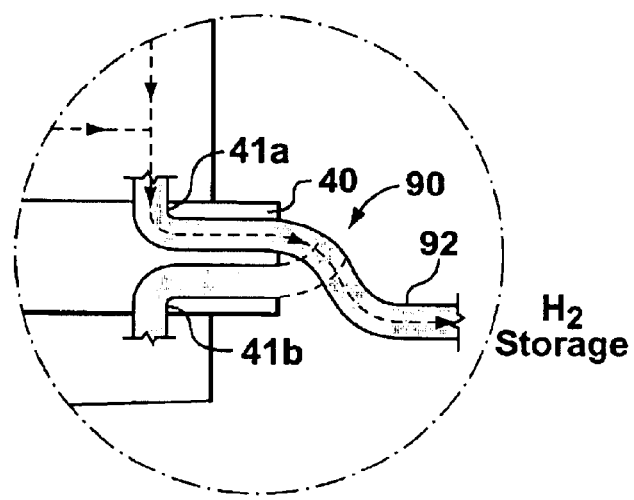
FIG. 8a
FIG. 8b
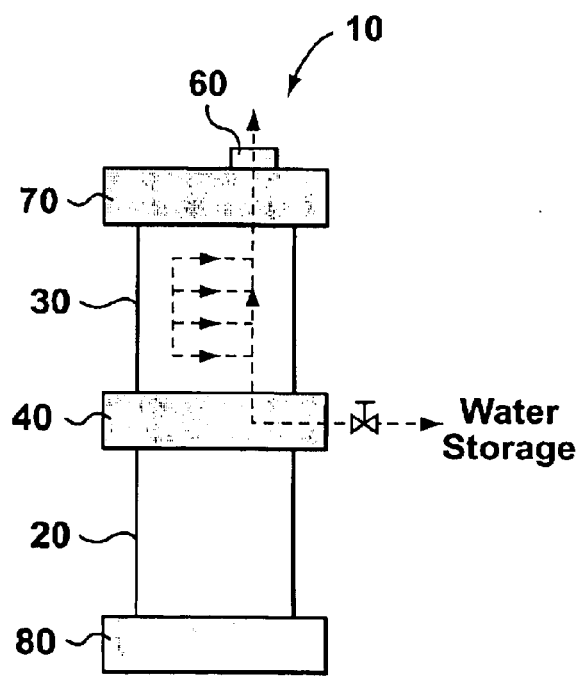
FIG. 9

UNITIZED REGENERATIVE FUEL CELL WITH BIFUNCTIONAL FUEL CELL HUMIDIFIER AND WATER ELECTROLYZER

FIELD OF THE INVENTION

This invention relates to a regenerative fuel cell system. More particularly, this invention relates to a regenerative fuel cell apparatus which combines a fuel cell unit and an electrolyzer unit, and method of use thereof.

BACKGROUND OF THE INVENTION

Fuel cells have been proposed as a clean, efficient and environmentally friendly power source that has various applications. A conventional proton exchange membrane (PEM) fuel cell is typically comprised of an anode, a cathode, and a selective electrolytic membrane disposed between the two electrodes. A fuel cell generates electricity by bringing a fuel gas (typically hydrogen) and an oxidant gas (typically oxygen) respectively to the anode and the cathode. In reaction, a fuel such as hydrogen is oxidized at the anode to form cations (protons) and electrons by the reaction $H_2 = 2H^+ + 2e-$. The proton exchange membrane facilitates the migration of protons from the anode to the cathode while preventing the electrons from passing through the membrane. As a result, the electrons are forced to flow through an external circuit thus providing an electrical current. At the cathode, oxygen reacts with electrons returned from the electrical circuit to form anions. The anions formed at the cathode react with the protons that have crossed the membrane to form liquid water as the reaction by-product following $\frac{1}{2}O_2 + 2H^+ + 2e- = H_2O$. On the other hand, an electrolyzer uses electricity to electrolyze water to generate oxygen from its anode and hydrogen from its cathode. Similar to a fuel cell, a typical solid polymer water electrolyzer (SPWE) or proton exchange membrane (PEM) electrolyzer is also comprised of an anode, a cathode and a proton exchange membrane disposed between the two electrodes. Water is introduced to, for example, the anode of the electrolyzer which is connected to the positive pole of a suitable direct current voltage. Oxygen is produced at the anode by the reaction $H_2O = \frac{1}{2}O_2 + 2H^+ + 2e-$. The protons then migrate from the anode to the cathode through the membrane. On the cathode which is connected to the negative pole of the direct current voltage, the protons conducted through the membrane are reduced to hydrogen following $2H+ + 2e- = H_2$.

It is well known in the art that one type of regenerative fuel cell system combines separated fuel cell and electrolyzer units so that during the fuel cell mode of the system, the fuel cell unit generates electricity while consuming fuel gas (typically hydrogen) and oxidant (typically oxygen or air) and during the electrolyzer mode of the system, the electrolyzer unit generates the two process gases for consumption by the fuel cell unit, i.e. oxygen and hydrogen, while consuming electricity. Individual fuel cell and electrolyzer cells are usually interconnected in a series arrangement, often called "stacks".

U.S. Pat. No. 5,376,470 entitled "Regenerative Fuel Cell System" and No. 5,506,066 entitled "Ultra-Passive Variable Pressure Regenerative Fuel Cell System", both issued to Rockwell International Corporation, disclose such a regenerative fuel cell system. The regenerative fuel cell system comprises a fuel cell including an anode for receiving hydrogen and a cathode for receiving oxygen, an electrolyzer for electrolyzing water to produce pure hydrogen and pure oxygen, storage tanks to respectively store hydrogen and oxygen from the electrolyzer, a water storage tank communicating with the fuel cell and the electrolyzer. The fuel cell is located above the water storage tank while the electrolyzer is located below the water storage tank. Hydrogen is supplied to the fuel cell during fuel cell mode or extracted from the cathode side of the electrolyzer during electrolyzer mode via a hydrogen line that is connected to the hydrogen storage tank and through a liquid-gas separator. Similarly, oxygen is supplied to the fuel cell via lines and through the water storage tank during fuel cell mode or extracted from the anode side of the electrolyzer via an oxygen line and through the water storage tank. The oxygen, when reaching the water storage tank, bubbles up to the fuel cell via a supply line during fuel cell mode or to the oxygen storage tank, when in the electrolyzer mode.

However, these regenerative fuel cell systems cannot meet the increasingly demanding requirement for fuel cell stacks. The systems are usually large in size and heavy in weight and require complex plumbing and ancillary equipment such as valves and controls. As is known in the art, the performance of the fuel cell unit in this system cannot be optimized unless an additional humidification device is provided to humidify the process gases and an additional heat exchanger is included to facilitate the heat dissipation, all of which results in increased system size and weight. When switching from electrolyzer mode to fuel cell mode, the fuel cell unit in the conventional regenerative fuel cell systems is cold and therefore is unable to achieve full power output until the stack is warm.

Moreover, at present there is an expanding interest in vehicular applications of fuel cell stacks, e.g. as the basic power source for cars, buses and even larger vehicles. Vehicular applications are quite different from many stationary applications. In stationary applications, fuel cell stacks are usually used as an electrical power source and are simply expected to run at a relatively constant power level for an extended period of time. In contrast, in a vehicular, particularly an automotive environment, the actual power required from the fuel cell stack can vary significantly. Moreover, the fuel cell stack is expected to respond rapidly to changes in power demand while maintaining high efficiencies. Further, for vehicular, particularly automotive applications, a fuel cell power unit is expected to operate under a disparate range of ambient temperature and humidity conditions. In addition, during regenerative braking period, the prior regenerative fuel cell systems are unable to capture the electricity to recharge the system due to their slow switchover times, making them less efficient. All these requirements are exceedingly demanding and make it difficult to incorporate a conventional regenerative fuel cell system into a vehicle and operate efficiently.

In view of the disadvantages and drawbacks associated with conventional regenerative fuel cell systems, it is desirable to provide a regenerative fuel cell system that enables improved fuel cell performance, including rapid switchover between fuel cell and electrolyzer modes, instantaneous full power operation, higher power density, less peripherals and hence higher system efficiency.

SUMMARY OF THE INVENTION

According to a first aspect of the present invention, a regenerative fuel cell system is provided, comprising an electrolyzer portion and a fuel cell portion;

the electrolyzer portion has a closeable hydrogen inlet and a hydrogen outlet in communication with the cathode of the electrolyzer portion for conducting hydrogen, a gas bypass having a gas bypass inlet and a gas bypass outlet for conducting oxidant gas for fuel cell reaction to the fuel cell portion, a water inlet and an oxygen-water outlet for exhausting oxygen generated in electrolyzer operation and coolant water from the fuel cell portion out of the electrolyzer portion;

the fuel cell portion has a hydrogen inlet, a first closeable hydrogen outlet for exhausting excess hydrogen in fuel cell mode, a second closeable hydrogen outlet for exhausting hydrogen generated in the electrolyzer portion in electrolyzer mode, an oxidant gas inlet, an oxidant gas outlet, a coolant water inlet and a coolant water outlet; and the hydrogen inlet of the fuel cell portion being in communication with the hydrogen outlet of the electrolyzer portion; the oxidant gas inlet of the fuel cell portion being in communication with the gas bypass outlet of the electrolyzer portion; and the water inlet of the electrolyzer portion being in communication with the coolant water outlet of the fuel cell portion.

Preferably, the fuel cell portion and the electrolyzer portion are in juxtaposition. More preferably, the fuel cell portion and the electrolyzer portion are stacked one on top of the other, with the electrolyzer portion on the top.

The fuel cell portion comprises at least one proton exchange membrane fuel cell having an anode bipolar plate and a cathode bipolar plate; and the electrolyzer portion comprises at least one proton exchange membrane electrolyzer cell having an anode bipolar plate and a cathode bipolar plate.

Preferably, the regenerative fuel cell system further includes a separator plate sandwiched between the fuel cell portion and the electrolyzer portion, said separator plate is provided with a hydrogen port functioning as the hydrogen inlet for the fuel cell portion and the hydrogen outlet for the electrolyzer portion, an oxidant gas port functioning as the oxidant gas inlet for the fuel cell portion and the gas bypass outlet for the electrolyzer portion, and a water port functioning as the coolant water outlet for the fuel cell portion and the water inlet for the electrolyzer portion.

More preferably, the said second closeable hydrogen outlet is in alignment with the said hydrogen inlet of the fuel cell portion. More preferably, a common current collector plate is sandwiched between the anode of the fuel cell portion and the cathode of the electrolyzer portion, and said current collector plate is provided with a hydrogen port functioning as the hydrogen inlet for the fuel cell portion and the hydrogen outlet for the electrolyzer portion, an oxidant gas port functioning as the oxidant gas inlet for the fuel cell portion and the gas bypass outlet for the electrolyzer portion, and a water port functioning as the coolant water outlet for the fuel cell portion and the water inlet for the electrolyzer portion. Alternatively, the common current collector plate is grounded.

More preferably, the said gas bypass of the electrolyzer portion is provided on the face of the anode bipolar plate of each electrolyzer cell facing away from the proton exchange membrane.

More preferably, the said separator plate further includes a switch means in fluid communication with the hydrogen outlet of the electrolyzer portion, the hydrogen inlet of the fuel cell portion and an external hydrogen storage means, and said switch means operatively switches between a first position in which it fluidly communicates the hydrogen outlet of the electrolyzer portion to the external hydrogen storage means, and a second position in which it fluidly communicates the hydrogen outlet of the electrolyzer portion with the hydrogen inlet of the fuel cell portion.

More preferably, the electrolyzer portion further includes an additional hydrogen outlet for supplying the hydrogen generated in electrolyzer mode to an external storage means, and a purge means that purges the water carried by the hydrogen generated in the electrolyzer mode.

According to a second aspect of the present invention, a method of operating the regenerative fuel cell system in the first aspect of the present invention is provided, wherein comprising:

in fuel cell mode, introducing hydrogen into the electrolyzer portion via the said closeable hydrogen inlet so that hydrogen flows across the cathode of the electrolyzer portion before entering the fuel cell portion for reaction; introducing oxidant gas into the electrolyzer portion via the said gas bypass inlet so that the oxidant gas flows along the gas bypass and leaves the electrolyzer portion before entering the fuel cell portion; introducing coolant water into the electrolyzer portion after the coolant water flows through the fuel cell portion so that the coolant water flows across the anode of the electrolyzer portion; and in electrolyzer mode, closing the said closeable hydrogen inlet and running the hydrogen generated into the fuel cell portion through the fuel cell portion; introducing coolant water of the fuel cell portion into the anode of the electrolyzer portion after the coolant water flows through the fuel cell portion.

The structure of the regenerative fuel cell system according to the present invention provides significant advantages over the existing system. First of all, the switchover time between the two operation modes is reduced to a minimum because the exchange of water and gas streams between the electrolyzer and the fuel cell portions ensures the reactant gases and liquid are on the proper electrodes for each reaction. In addition, both the fuel cell portion and electrolyzer portion are able to achieve full power instantaneously after the system is switched from one mode to the other due to the exchange of water and gas streams between the two sections. This water and gas exchange maintains both the fuel cell and electrolyzer portions of the stack at full operating temperature as well as maintaining the fuel cell portion in a humidified condition. In fact, the electrolyzer portion functions as a humidification section for the fuel gases, i.e. hydrogen for the fuel cell portion so that the higher temperature of operation is possible without drying out the MEA of the fuel cells. The electrolyzer portion also functions as a heat exchanger for the fuel cell portion to dissipate heat as a result of the exchange of water and gases between the two portions. Further, the electrolyzer portion preheats the fuel cell supply gases, preventing condensation and flooding in the first cells of the fuel cell portion, a common problem with cold gas streams. This heat exchange process serves to warm up the electrolyzer portion itself, improving the performance of the electrolyzer when switching to the electrolyzer mode of operation. In addition, the present system even allows for simultaneous fuel cell and electrolyzer operation, eliminating switchover time between the two modes of operation. This further demonstrates the instant on capability of the regenerative fuel cell system, making it suitable for deployment in vehicular applications for the reasons outlined in the aforementioned background technology. The rapid switchover time enables the system to capture the electricity energy to recharge the system during regenerative braking period when it is applied in vehicular applications, thereby making the regenerative fuel cell system more efficient. This rapid switchover time also makes the system well suited to UPS power type applications where seamless transfer between power generation and power storage modes of operation are required.

Further, since the electrolyzer and fuel cell portions share the single water cooling and humidification loop, and since most of the cooling and humidification happens internally, the system requires less plumbing and less pipe or conduit components. Therefore the structure of the system is simplified, resulting in reduced size and weight.

BRIEF DESCRIPTION OF THE DRAWINGS

For a better understanding of the present invention, and to show more clearly how it may be carried into effect, reference will now be made to the accompanying drawings which show, by way of example, preferred embodiments of the present invention, and in which;

FIG. 8a is a schematic view, which illustrates a separator plate incorporating a switch means of the regenerative fuel cell system according to the present invention, and FIG. 8b is an expanded view of part of FIG. 8a; and FIG. 9 is a schematic view, which illustrates a separator plate incorporating a purge valve of the regenerative fuel cell system according to the present invention.

DETAILED DESCRIPTION OF THE INVENTION

Figure 1:
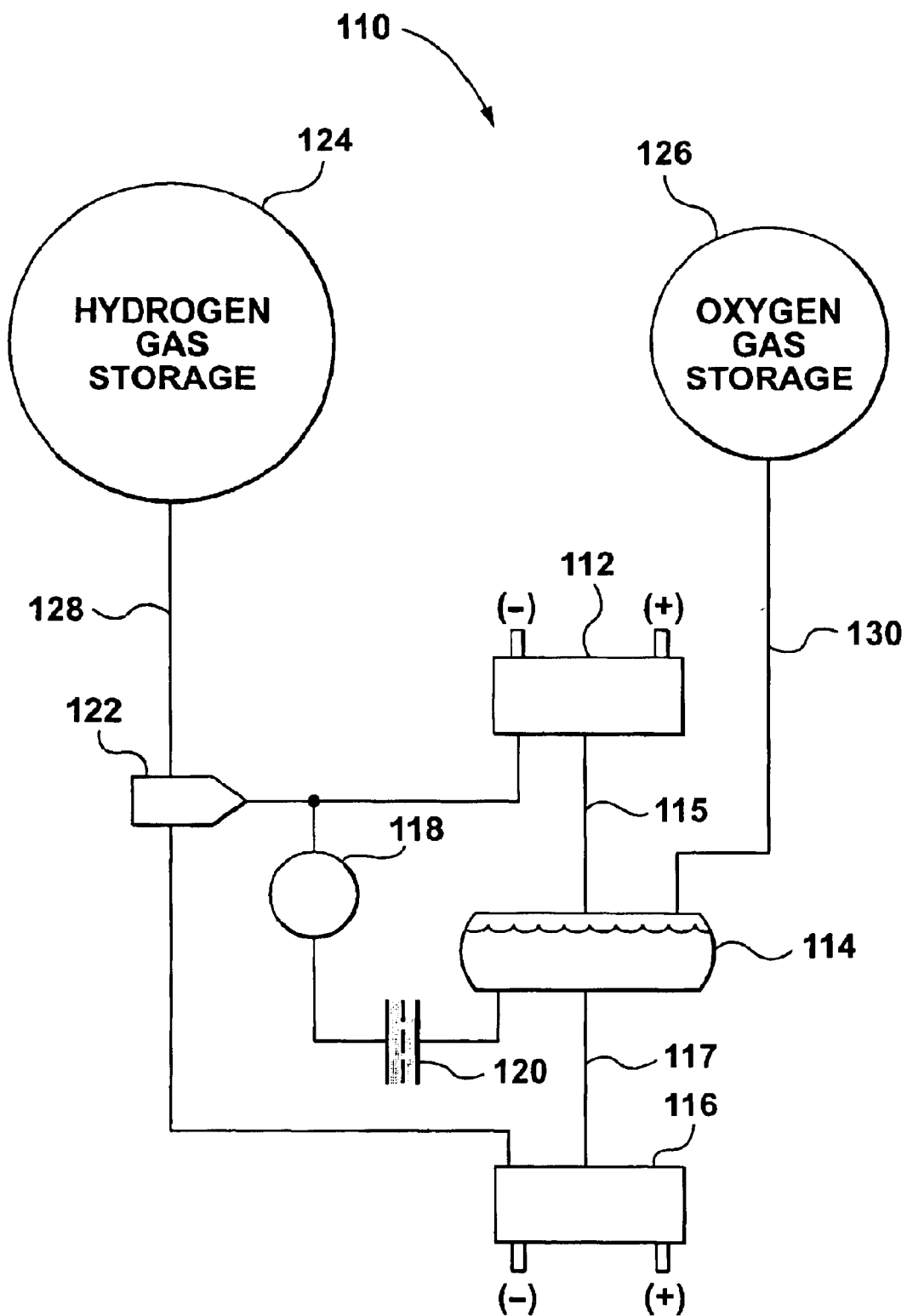
FIG. 1 is a schematic view, which illustrates a conventional regenerative fuel cell system.

A conventional regenerative fuel cell system, for example, as disclosed in U.S. Pat. No. 5,376,470 is shown in FIG. 1. The regenerative fuel cell system comprises a fuel cell 112 including an anode for receiving hydrogen and a cathode for receiving oxygen, an electrolyzer 116 for electrolyzing water to produce pure hydrogen and pure oxygen, storage tanks 124, 126 to respectively store hydrogen and oxygen, and water storage tank 114 communicating with said fuel cell 112 and the electrolyzer 116. The fuel cell 112 is located above the water storage tank 114 while the electrolyzer 116 is located below the water storage tank 114. Hydrogen is supplied to the fuel cell 112 during fuel cell mode or extracted from the cathode side of the electrolyzer 116 during electrolyzer mode via a hydrogen line 128 that is connected to the hydrogen storage tank 124 and through a liquid-gas separator 122. A flow valve 120 and a secondary water storage tank 118 are provided, for humidifying the hydrogen stream. Similarly, oxygen is supplied to the fuel cell 112 via lines 130 and 115 and through the water storage tank 114 during fuel cell mode or extracted from the anode side of the electrolyzer 116 via oxygen line 130 and 117 and through the water storage tank 114. In the electrolyzer mode, the oxygen generated flows up to the water storage tank 114 and then bubbles up to the fuel cell via line 115 if the fuel cell is in the fuel cell mode or to oxygen storage means 126 via line 130 if the fuel cell is not operating.

Figure 2A:
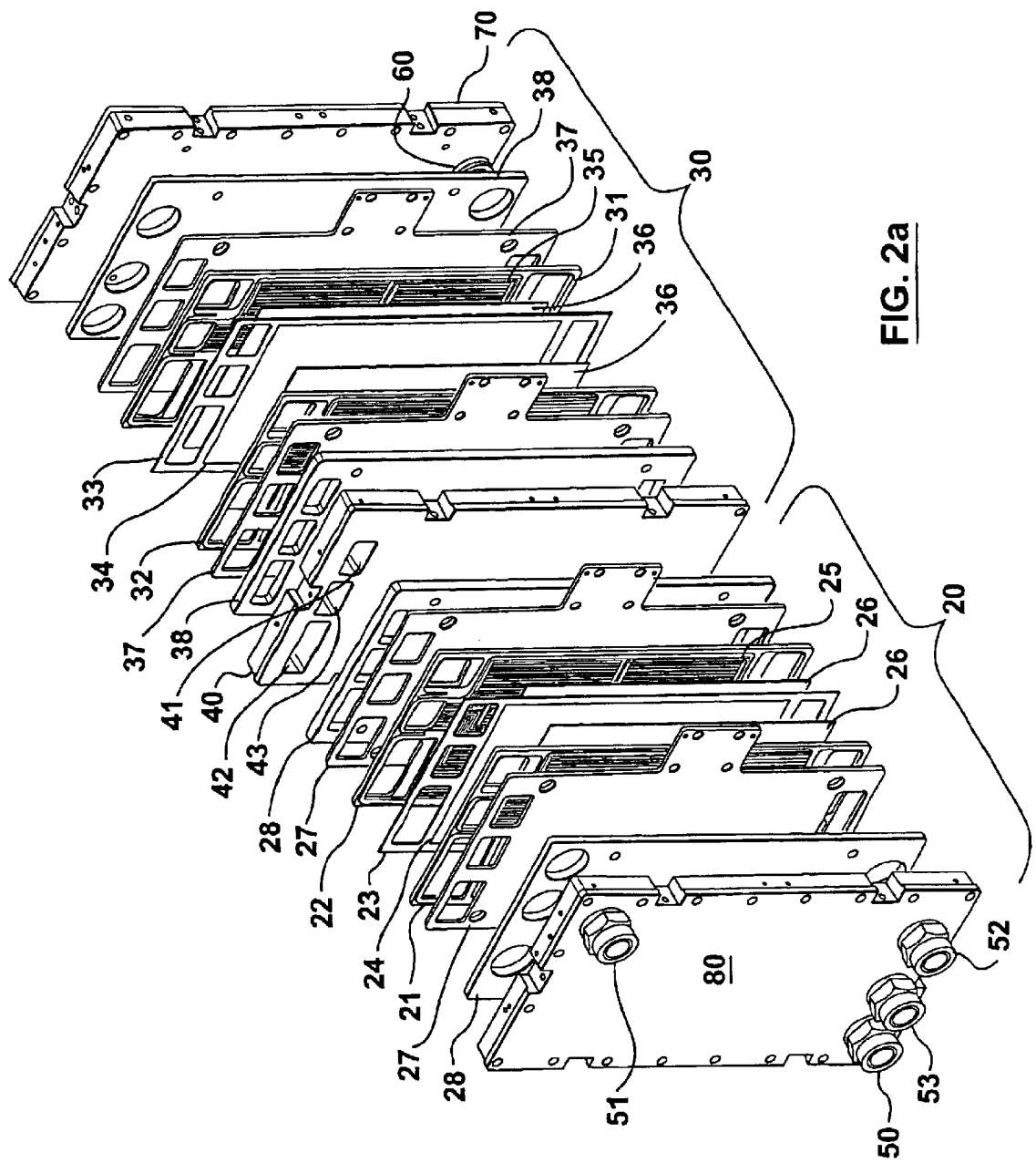
FIGS. 2a and 2b are exploded perspective views, which illustrate the regenerative fuel cell system according to a first embodiment of the present invention.

FIG. 2a shows a first embodiment of the regenerative fuel cell system according to the present invention. In the following description, for the purpose of illustration, fuel cells are described by taking PEM fuel cells as an example, and likewise, the process gases discussed hereinafter are limited to pure hydrogen and air. However, it should be appreciated that the fuel cell in the present invention is not limited to PEM fuel cells and the process gases can be different; for example it is common to use air as a source of an oxidant gas.

The present regenerative fuel cell system 10 includes a fuel cell portion 20 and an electrolyzer portion 30. In practice, each of the fuel cell portion 20 and the electrolyzer portion 30 may consist of a plurality of individual cells that are stacked in series. For simplicity, in FIG. 2a the fuel cell portion 20 is shown including only one fuel cell and similarly the electrolyzer portion 30 is shown including only one electrolyzer cell.

Each fuel cell comprises an anode bipolar plate 21, a cathode bipolar plate 22 and a membrane electrode assembly (MEA) 23 sandwiched between the anode 21 and cathode 22. The MEA 23 has a proton exchange membrane (PEM) 24. It is to be understood that designations "front" "rear" used hereinafter with respect to the anode and cathode bipolar plates of fuel cells and electrolyzer cells, indicates their orientation with respect to the MEA 23. Thus, "front" indicates the face towards the MEA 23; the indication "rear" indicates the face away from the MEA 23. Each of the anode bipolar plate 21 and the cathode bipolar plate 22 is provided with a flow field 25 on the front face thereof, for respectively introducing a process gas, e.g. hydrogen or oxygen to one side of the said membrane 24 for reaction. The anode and cathode bipolar plates also have coolant flow fields on the respective back faces thereof, which allow the coolant to pass through chambers between and adjacent the fuel cells, to remove heat from the fuel cell since the reaction is exothermic.

Three inlets are provided on one end of each bipolar plate 21, 22 respectively for hydrogen, air or oxygen, and a coolant, usually water. On the opposite end of each bipolar plate 21, 22, three corresponding outlets are provided. These inlets and outlets, in known manner, include openings extending through the bipolar plates 21, 22, so that, in a complete fuel cell stack with many individual fuel cells, the ports align to form continuous supply ducts for the various fluids.

A gas diffusion media (GDM) 26 is interposed between one surface of the MEA 23 and the anode bipolar plate 21, and similarly another GDM 26 is placed between the opposite surface of the MEA 23 and the cathode bipolar plate 22, to enable the diffusion of the process gas, either the fuel or oxidant, to the surface of the MEA 23 and provide conduction of electricity between the respective bipolar plates 21, 22 and the MEA 23. Two current collector plates 27 respectively abut against rear surfaces of the outermost bipolar plates 21, 22 of the fuel cell stack, i.e. opposite to the surface adjacent to the MEA 23, to collect the current from the bipolar plates 21, 22 and connect to an external circuit (not shown). To complete the whole stack, two insulator plates 28 are provided abutting against the outer surfaces of the current collector plates 27 and two end plates 40, 80 are also provided abutting against the outer surfaces of the insulator plates 28. The end plates 40, 80 are provided for structural reasons and can be used to press the electrolyzer stack together by means of bolts, etc.

Similarly, the electrolyzer portion 30 is shown to include only one electrolyzer cell. In this embodiment, a conventional structure of electrolyzer cells is described by way of example, and in many ways this corresponds to the structure of the fuel cells. Each electrolyzer cell comprises an anode bipolar plate 31, a cathode bipolar plate 32 and a membrane electrode assembly (MEA) 33 sandwiched between the anode 31 and cathode 32. The MEA 33 has a proton exchange membrane (PEM) 34. The anode bipolar plate 31 is provided with a flow field 35 on the front face thereof for introducing water to one side of the membrane 34 for reaction. On the rear face of the anode bipolar plate 31, an air bypass flow field (not shown) is provided forth air used in fuel cell reaction to bypass the electrolyzer portion. The cathode bipolar late 32 is also provided with a flow field 35 on the front surface thereof for conducting the hydrogen through the electrolyzer portion 30 to the fuel cell portion 20 (either enerated in the electrolyzer reaction or to be used in the fuel cell reaction from external storage means). It is to be understood that in an electrolyzer stack comprising a plurality of electrolyzer cells, the air bypass flow field is formed by the rear face of the anode late of one cell and the rear face of the cathode plate of an adjacent cell abutting against this anode plate. Either the rear face of the anode plate or the rear face of the cathode plate (or both) may be provided with flow channel to form the flow field while the other face is smooth.

Three inlets are provided adjacent one end of each bipolar plate 31, 32 respectively for hydrogen, air or oxygen and coolant, usually water. Three corresponding outlets are provided adjacent the opposite end of each bipolar plate 31, 32. As for the fuel cell portion 20, the inlets and outlets are openings extending through the bipolar plates 31, 32. A gas diffusion media (GDM) 36 is interposed between one surface of the MEA 33 and the anode bipolar plate 31, and similarly another GDM 36 is placed between the opposite surface of the MEA 33 and the cathode bipolar plate 32. On the anode, the gas diffusion media enables the diffusion of the process water to the surface of the MEA 33 and provides conduction of electricity between the bipolar plate 31 and the MEA 33. On the cathode, the gas diffusion media enables the diffusion of the product gas (hydrogen) away from the surface of the MEA 33 and provides conduction of electricity between the bipolar plate 32 and the MEA 33.

Two current collector plates 37 respectively abut against rear surfaces of the outermost bipolar plates 31, 32, i.e. opposite to the surfaces adjacent to the MEA 33, to collect the current from the bipolar plates 31, 32 and connect to an external circuit (not shown). To complete the whole stack, two insulator plates 38 are provided abutting against the outer surfaces of the current collector plates 37 and two end plates 40, 70 are also provided abutting against the outer surfaces of the insulator plates 38. Pressure again can be applied on the end plates 40, 70 to press the stack together by means of bolts, etc.

Figure 2B:
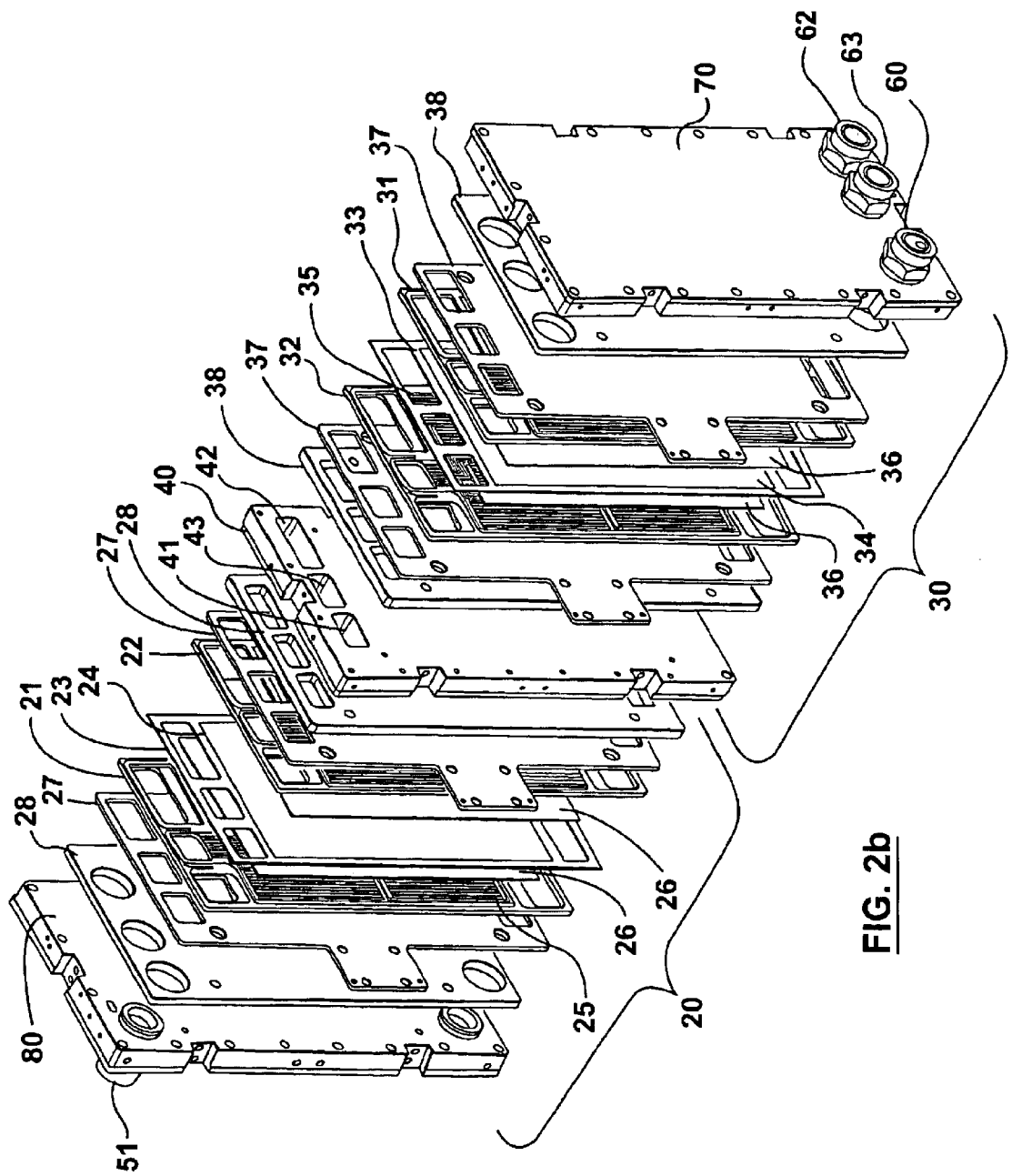

In the present invention, the fuel cell portion 20 and he electrolyzer portion 30 are preferably stacked together. Therefore, only one end late is needed between the two portions, which, as noted above, is the common separator plate 40. As can be seen in FIG. 2b, the end plate 80 of the fuel cell portion 20 has four ports each communicating between the internal flow fields of the fuel cell portion 20 and outside pipelines or conduits to allow process gases and coolant to flow through, specifically, a fuel cell hydrogen outlet 50, an electrolyzer hydrogen out 51, a fuel cell air outlet 52 and a water inlet 53. The end plate 70 of the electrolyze portion 30 has three ports communicating between the internal flow fields of the electrolyzer portion 30 and outside pipelines, specifically, a fuel cell hydrogen inlet 60, an air inlet 62 and a water outlet 63. Similarly, on the separator plate 40, there are provided three ports corresponding to the three ports of the electrolyzer end plate 70 to communicate between the fuel cell and electrolyzer portions on opposite sides of the separator plate 40, specifically a hydrogen port 41, an air port 42 and a water port 43. On the end plates 70, 80, the ports are adapted to connect to pipes or conduits as well as valves or switches. On the separator plate 40, the ports are preferably in the norm of through holes with necessary seals provided around them. It is to be understood hat the relative position sequence of the anode and cathode bipolar plates in either fuel cell portion or electrolyzer portion may be different and this will not affect the operation of the regenerative fuel cell system of the present invention. In other words, the bipolar plate immediately adjacent the separator plate 40 in the fuel cell portion 20 ay be either an anode bipolar plate or a cathode bipolar plate. Likewise, the bipolar plate immediately adjacent the separator plate 40 in the electrolyzer portion 30 may be either an anode bipolar plate or a cathode bipolar plate.

The various ports for fuel cell and electrolyzer portions 20, 30 have been described above as being, an "inlet" and "outlet". However, it is to be appreciated that in general flows of the various fluids may be reversed as between the fuel cell and electrolyzer modes; alternatively, or as well, for some modes of operation, while flow directions for a fluid may be the same in both electrolyzer and fuel cell modes, the flow direction could be different from that described. Accordingly, the ports can be identified, more generically as follows. First, on the end plate 70 for the electrolyzer portion 30, the ports 60, 62 and 63 can be considered as a first electrolyzer cathode port 60, a first gas bypass port 62 and a first electrolyzer anode port 63. The port 62 is designated as a "bypass port", since the oxidant is considered to "bypass" the active area of the electrolyzer cells. For the end plate 80, the ports 50, 51, 52 and 53 can be considered as: a first fuel cell anode port 50; third fuel cell anode port 51; a first fuel cell cathode port 52; and a first coolant port 53; the port 51 is designated as a third port, as it is, in some senses, optional depending upon the configuration for extracting hydrogen during electrolysis, and the designation of the second port is reserved for the hydrogen or anode port at the other end of the fuel cell portion.

The middle or separator plate 40 then has the three parts 41, 42 and 43, which provide second ports for both the fuel cell portion and the electrolyzer portion, as follows: port 41 provides a second cathode port of the electrolyze and a second anode port of the fuel cell portion; port 42 provides a second air or gas bypass port of the electrolyzer portion and a second cathode port of the fuel cell portion; port 43 provides a second anode port of the electrolyzer portion and a second coolant port of the fuel cell portion.

In the following description of the operation of the fuel cell portion 20 and the electrolyzer portion 30, the previous designations "inlet" and "outlet" are used. However, it will be appreciated that, as mentioned, in some applications, it may be desirable to reverse the flows. Reversing flows will have implications for heat transfer as between the fuel cell and the electrolyzer portions 20, 30 and this will need to be taken into account in determining desirable flow directions.

Now the operation in two modes of the regenerative fuel cell system according to the present invention will be described in detail with reference being made to FIGS. 3a-3c, 4a-4c and 5a-5b.

Fuel Cell Operation (1) Hydrogen Flow

Figure 3A:
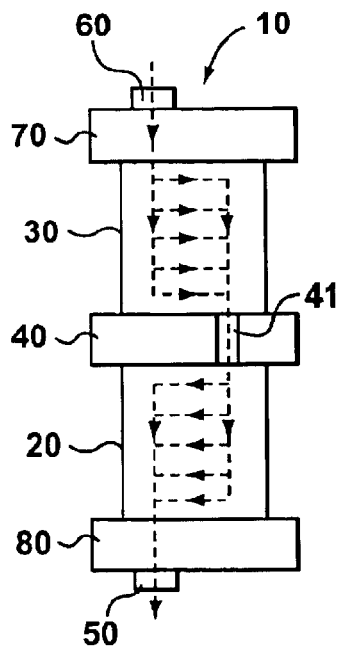
FIG. 3a is a schematic view, which illustrates the hydrogen flow in the regenerative fuel cell system according to the first embodiment of the present invention when the system runs in fuel cell mode.

FIG. 3a illustrates the hydrogen flow when the regenerative fuel cell system runs in the fuel cell mode. As can be seen in FIG. 3a, the hydrogen first enters the electrolyzer portion 30 of the regenerative fuel cell stack from a hydrogen storage means (not shown) via the fuel cell hydrogen inlet 60 provided on the electrolyzer end plate 70 and flows to the hydrogen inlet of the flow field 35 adjacent one end of cathode bipolar plate 32 of each electrolyzer cell. The hydrogen flows from the hydrogen inlet, crosses the cathode flow field 35 of each electrolyzer cell (FIG. 5a) and reaches the hydrogen outlet of the flow field 35 adjacent the opposite end of the cathode bipolar plate 32 of each electrolyzer cell. Then the hydrogen exits the flow fields 35 of the electrolyzer cells via the hydrogen outlets and leaves the electrolyzer portion 30, without any reaction, via the hydrogen port 41 provided on the separator plate 40. In this embodiment, as is known in the art, the fuel cell hydrogen port 60 on the electrolyzer end plate 70 is in alignment with the hydrogen inlets of flow fields 35 on the cathode bipolar plates 32 of the electrolyzer cells. Likewise, the hydrogen port 41 on the separator plate 40 is in alignment with the hydrogen outlets of the flow fields 35 of the cathode bipolar plates 32 of the electrolyzer cells.

Figure 5A:
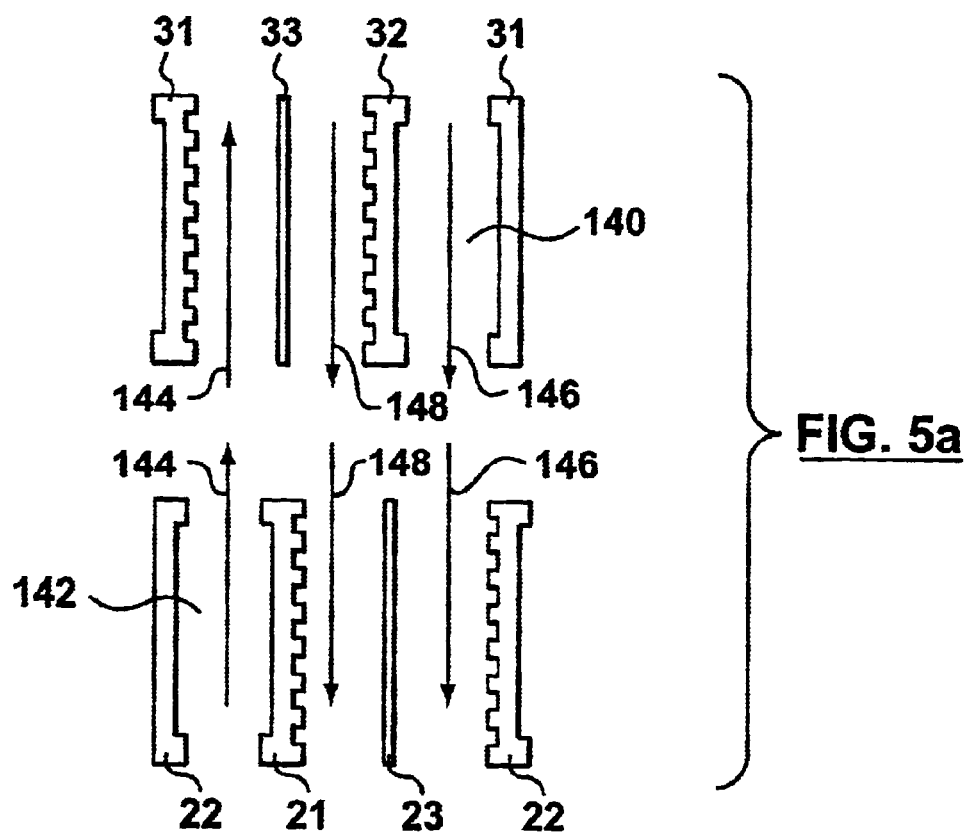
FIGS. 5a and 5b are a schematic views, which illustrate the flows of the process gases and water in both the electrolyzer and fuel cell portions of the regenerative fuel cell system according to the present invention in the fuel cell mode and the electrolyzer modes respectively.
Figure 5B:
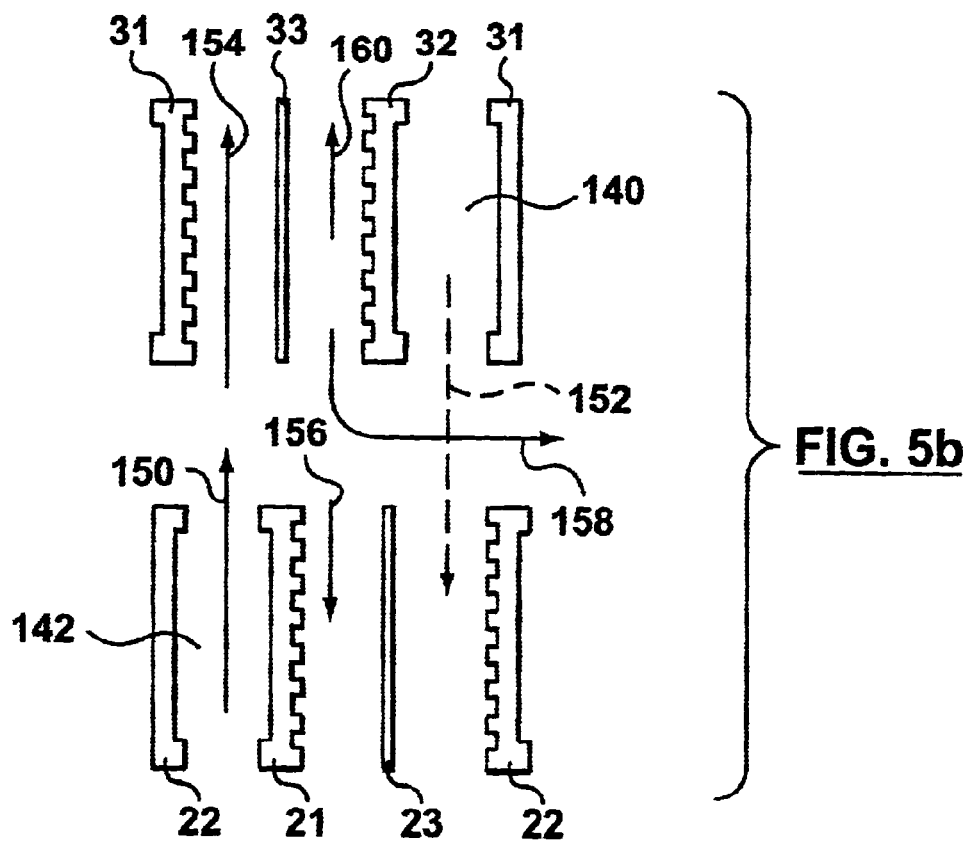

After passing through the hydrogen port 41, the hydrogen enters the fuel cell portion 20 and flows to the hydrogen inlet of the flow field 25 adjacent one end of the anode bipolar plate 21 of each fuel cell. The hydrogen then enters the flow fields 25 of the anode bipolar plates 21 from the hydrogen inlets thereof. The hydrogen spreads across the flow field 25 and, in known manner, reacts on the anode side of the proton exchange membranes 24 of each fuel cell in the presence of a catalyst, generating protons that pass through the membrane (FIG. 5b). The unreacted hydrogen continues to flow and exits the flow field 25 of each fuel cell via the hydrogen outlet of the flow field 25 adjacent the opposite end of the anode bipolar plate 21 of each fuel cell. The hydrogen then leaves the fuel cell portion 20 via the fuel cell hydrogen outlet 50 provided on the fuel cell end plate 80 and returns to the hydrogen storage means or is exhausted to the environment. In this embodiment, as is known in the art, the hydrogen port 41 on the separator plate 40 is in alignment with the hydrogen inlets of the flow fields 25 of the anode bipolar plates 21 of the fuel cells. Likewise, the fuel cell hydrogen outlet 50 on the fuel cell end plate 80 is in alignment with the hydrogen outlets of the flow fields 25 of the anode bipolar plates 21 of the fuel cells.

It should be mentioned that on the fuel cell end plate 80, another hydrogen outlet is provided, i.e. the electrolyzer hydrogen outlet 51, which is in alignment with the hydrogen inlets of the flow fields 25 of the anode bipolar plates 21 of the fuel cells. However, when the regenerative fuel cell system runs in the fuel cell mode, the fuel cell hydrogen outlet 50 on the fuel cell end plate 80 is in an open position while the electrolyzer hydrogen outlet 51 is in closed position. Therefore, after entering the fuel cell portion 20 via the hydrogen port 41, the hydrogen cannot exit the fuel cell portion 20 by directly flowing to the electrolyzer hydrogen outlet 51. On the contrary, the hydrogen is forced to flow across the flow fields 25 and out of the fuel cell hydrogen outlet 50, which is then the only passage available.

(2) Air Flow

Figure 3B:
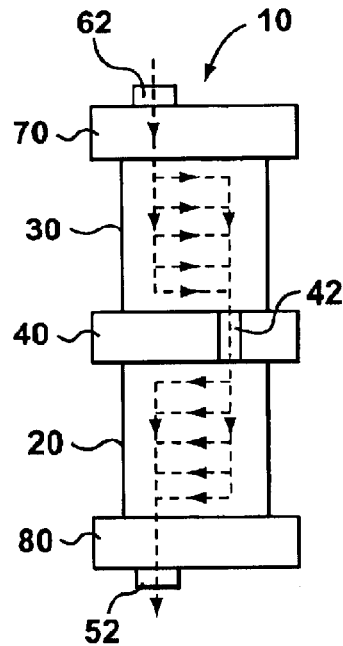
FIG. 3b is a schematic view, which illustrates the oxygen or air flow in the regenerative fuel cell system according to the first embodiment of the present invention when the system runs in fuel cell mode.

FIG. 3b illustrates the air flow when the regenerative fuel cell system runs in the fuel cell mode. As can be seen in FIG. 3b, ambient air, or other suitable oxidant, first enters the electrolyzer portion 30 from an air supply means, usually a compressor, a blower or a fan (not shown), via the fuel cell air inlet 62 on the electrolyzer end plate 70 and flows to an air inlet port of the air bypass flow field of the anode bipolar plate 31 of each electrolyzer cell, provided adjacent one nd on the rear side of each anode bipolar plate 31. The air flows from the air inlets, crosses the air bypass flow fields of the electrolyzer cell and reaches the air outlets of the air bypass flow fields, adjacent the opposite ends of the anode bipolar plates 31, on the rear side of the anode bipolar plate 31 of each electrolyzer cell (FIG. 5a). In practice, when the regenerative fuel cell system switches from electrolyzer mode to fuel cell mode, passing the air through the relatively hot electrolyzer cells will be sufficient to heat the air up to the fuel cell operating temperature which is critical for proper fuel cell peration; once the fuel cell has been operating for some time, it will be sufficiently hot that upstream pre-heating of the air is not essential. Then the air exits the air bypass flow field of each electrolyzer cell via the air outlet and leaves the electrolyzer portion 30 without any reaction via the air port 42 provided on the separator plate 40. In this embodiment, as is known in the art, the fuel cell air in let 62 on the end plate 70 is in alignment with the air inlets of the air bypass flow fields on the rear sides of the anode bipolar piates 31. Likewise, the air port 42 on the separator plate 40 is in alignment with the air outlets of the air bypass flow fields on the rear sides of anode bipolar plates 31 the air bypass flow fields collectively providing an air bypass conduit.

After passing through the air port 42, the air enters the fuel cell portion 20 and flows to the inlet of the flow field 25 adjacent one end of the cathode bipolar plate 22 of each fuel cell. The air then enters the flow fields 25 of the cathode bipolar plates 22 from the inlets thereof. The air spreads across the flow fields 25 and reacts on the cathode side of the proton exchange membranes 24 of each fuel cell in the presence of catalyst (FIG. 5b). The unreacted air continues to flow and exits the flow field 25 of each fuel cell via the outlet of the flow field 25 adjacent the opposite end of the cathode bipolar plate 22 of each fuel cell. The air then leaves the fuel cell portion 20 via the fuel cell air outlet 52 provided on the fuel cell end plate 80. In this embodiment, as is known in the art, the air port 42 on the separator plate 40 is in alignment with the air inlets of the flow fields 25 on the cathode bipolar plates 22 of the fuel cells. Likewise, the fuel cell air outlet 52 on the fuel cell end plate 80 is in alignment with the air outlets of the flow fields 25 of the cathode bipolar plates 22 of the fuel cells.

(3) Water Flow

Figure 3C:
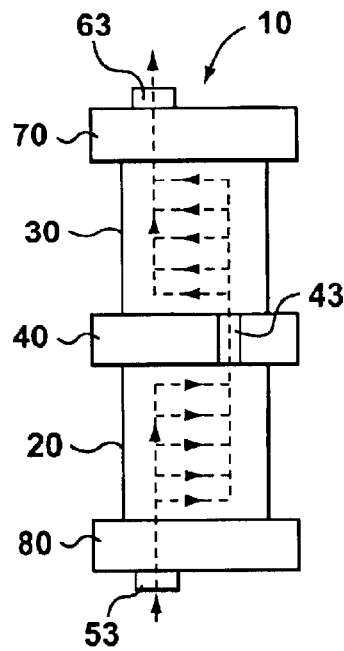
FIG. 3c is a schematic view, which illustrates the water flow in the regenerative fuel cell system according to the first embodiment of the present invention when the system runs in fuel cell mode.

Water works as a conventional coolant during fuel cell operation as the fuel cell reaction is an exothermic reaction. FIG. 3c illustrate water flow when the regenerative fuel cell system runs in the fuel cell mode. As can be seen in FIG. 3c, the water first enters the fuel cell portion 20 from a water storage means (not shown) via the water inlet 53 provided on the fuel cell end plate 80 and flows to the respective inlet of the coolant flow field adjacent one end of the anode and cathode bipolar plates 21, 22 of each fuel cell. In PEM fuel cell applications, the coolant flow fields are usually provided on the respective rear faces of the bipolar plates 21, 22. Water flows from the water inlets, crosses the coolant flow fields of the fuel cell and reaches the water outlets of the coolant flow fields adjacent the opposite end of the anode and cathode bipolar plates 21, 22 of each fuel cell (FIG. 5b). Then the water exits the coolant flow fields of the fuel cell via the outlets and leaves the fuel cell portion 20 via the water port 43 provided on the separator plate 40. In this embodiment, as is known in the art, the water inlet 53 on the fuel cell end plate 80 is in alignment with the inlets of the coolant flow fields on the anode and cathode bipolar plates 21, 22 of the fuel cells. Likewise, the water port 43 on the separator plate 40 is in alignment with the outlets of the coolant flow fields of the anode and cathode bipolar plates 21, 22 of the fuel cells.

After passing through the water port 43, the water enters the electrolyzer portion 30 and flows to each water inlet of the flow field 35 adjacent one end of the anode bipolar plate 31 of each electrolyzer cell. The water then enters the flow fields of the anode bipolar plates 31 from the water inlets thereof. The water spreads across the flow fields 35 (FIG. 5a), and exits the flow field 35 of each electrolyzer cell via the water outlet of the flow field 35 adjacent the opposite end of the anode bipolar plate 31 of each electrolyzer cell. The water then leaves the electrolyzer portion 30 via the water outlet 63 provided on the electrolyzer end plate 70 and goes to a water storage means (not shown) from which it is supplied to the electrolyzer cells as a reactant during electrolyzer operation. In this embodiment, as is known in the art, the water port 43 on the separator plate 40 is in alignment with the water inlets of the flow fields 35 on the anode bipolar plates 31 of the electrolyzer cells. Likewise, the water outlet 63 on the electrolyzer end plate 70 is in alignment with the water outlets of the flow fields 35 of the anode plates 31 of electrolyzer cells.

As can be appreciated from FIGS. 3a to 3c, during fuel cell operation, water continuously flows across the anode of the electrolyzer cells and when the system switches from fuel cell operation to electrolyzer operation, water is present at the anode electrode of each electrolyzer cell. The presence of water also prevents the electrolyzer membrane from drying out. In addition, water from the fuel cell portion is heated by the fuel cell reaction and in turn warms up the electrolyzer portion. Hence the electrolyzer portion is capable of operating at optimum conditions immediately and the switching time between the two modes is reduced to a minimum. Therefore, the performance of electrolyzer mode of the present system is significantly improved, particularly at startup. It should be appreciated that in practice, the coolant flow field may be provided only on the back face of the anode bipolar plate 21 or the back face of the cathode bipolar plate 22 of each fuel cell. However, for illustration purpose, both the anode and cathode bipolar plates 21, 22 are provided with coolant flow field in this embodiment.

Also, the membrane of the electrolyzer cells can be such as to enable water to diffuse through it into the hydrogen flow. Thus, the electrolyzer portion 30 then acts as a humidifier, humidifying incoming hydrogen. Heating the water in the fuel cell portion 20 further promotes this humidification process.

Electrolyzer Operation (1) Water Flow

Figure 4A:
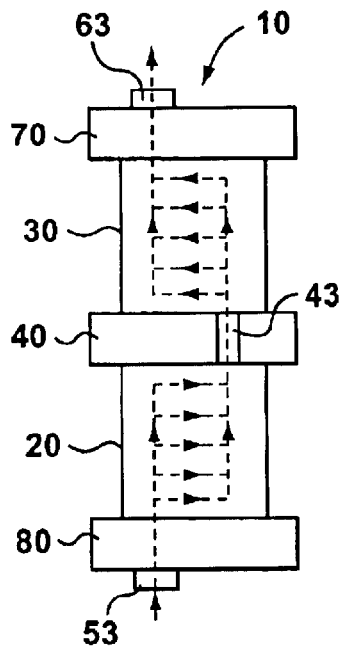
FIG. 4a is a schematic view, which illustrates the water flow in the regenerative fuel cell system according to the first embodiment of the present invention when the system runs in electrolyzer mode.

Water is the reactant during the electrolysis reaction. FIG. 4a illustrates the water flow when the regenerative fuel cell system runs in the electrolyzer mode. As can be seen in FIG. 4a, water first enters the fuel cell portion 20 from a water storage means (not shown) via the water inlet 53 provided on the fuel cell end plate 80 and flows to the respective inlet of the coolant flow field adjacent one end of the anode and cathode bipolar plates 21, 22 of each fuel cell. As explained above, in PEM fuel cell applications, the coolant flow fields are usually provided on the respective rear faces of the bipolar plates 21, 22. Water flows from the water inlets, crosses the coolant flow fields of the fuel cells and reaches the outlets of the coolant flow fields adjacent the opposite end of the anode and cathode bipolar plates 21, 22 of each fuel cell (FIG. 5b). Then water exits the coolant flow fields of the fuel cell via the water outlets and leaves the fuel cell portion 20 via the water port 43 provided on the separator plate 40. In this embodiment, as is known in the art, the water inlet 53 on the fuel cell end plate 80 is in alignment with the water inlets of the coolant flow fields on the anode and cathode bipolar plates 21, 22 of the fuel cells. Likewise, the water port 43 on the separator plate 40 is in alignment with the water outlets of the coolant flow fields of the anode and cathode bipolar plates 21, 22 of the fuel cells. In fact, the water flow within the fuel cell portion 20 in the electrolyzer mode is identical to that in the fuel cell mode, as shown in FIG. 3c.

After passing through the water port 43, water enters the electrolyzer portion 30 and flows to the water inlet of the anode flow field 35 adjacent one end of the anode bipolar plate 31 of each electrolyzer cell. The water then enters the flow fields 35 of the anode bipolar plates 31 from the water inlets thereof from the said water storage means. The water spreads across the flow fields 35 and is electrolyzed, generating hydrogen and oxygen at the cathodes and anodes respectively (FIG. 5a). The unreacted water combined with the generated oxygen exits the anode flow field 35 of each electrolyzer cell via the water outlet of the flow field 35 adjacent the opposite end of the anode bipolar plate 31 of each electrolyzer cell. The water and generated oxygen then leave the electrolyzer portion 30 via the water outlet 63 provided on the electrolyzer end plate 70, and the water returns to the said water storage means. In this embodiment, as is known in the art, the water port 43 on the separator plate 40 is in alignment with the water inlets of the flow fields 35 on the anode bipolar plates 31 of the electrolyzer cells. Likewise, the water outlet 63 on the electrolyzer end plate 70 is in alignment with the water outlets of the flow fields 35 of the anode bipolar plates 31 of the electrolyzer cells. Again, the water flow within the electrolyzer portion 20 in the electrolyzer mode is substantially similar to that in the fuel cell mode of FIG. 3c. The difference is that water acts as a reactant in the electrolyzer mode.

(2) Hydrogen Flow

Figure 4B:
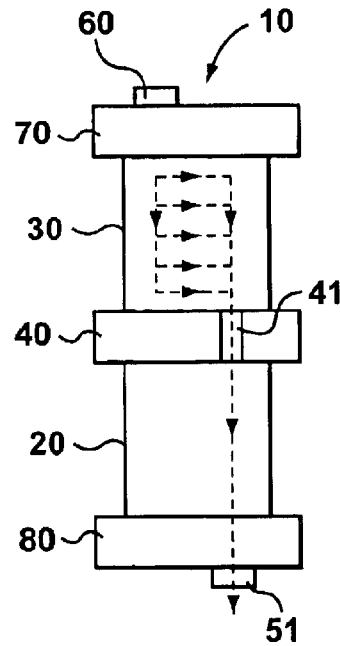
FIG. 4b is a schematic view, which illustrates the hydrogen flow in the regenerative fuel cell system according to the first embodiment of the present invention when the system runs in electrolyzer mode.

FIG. 4b illustrates the hydrogen flow when the regenerative fuel cell system runs in the electrolyzer mode. As is known in the art, hydrogen is the product of the electrolysis reaction on the cathode of the electrolyzer cells. During electrolyzer operation, the hydrogen inlet 60 provided on the electrolyzer end plate 70 is in closed position so that when hydrogen is generated within the electrolyzer portion 30, it will not flow across the cathode flow field 35 of each electrolyzer cell and exit the cathode flow field 35 via the inlet thereof adjacent one end of the cathode bipolar plate 32 of each electrolyzer cell. Instead, hydrogen flows across the cathode flow field 35 of each electrolyzer cell (FIG. 5*a*) and reaches the hydrogen outlet of the flow field 35 adjacent the opposite end of each cathode bipolar plate 32 since it is the only passage available. Then the hydrogen exits the cathode flow fields 35 of the electrolyzer cells via the hydrogen outlets and leaves the electrolyzer portion 30 via the hydrogen port 41 provided on the separator plate 40. As is known in the art, the hydrogen port 41 on the separator plate 40 is in alignment with the hydrogen outlets of the flow fields 35 of the cathode bipolar plates 32 of the electrolyzer cell.

After passing through the hydrogen port 41, the hydrogen enters the fuel cell portion 20 and flows to the hydrogen inlet of the flow field 25 adjacent one end of the anode bipolar plate 21 of each fuel cell. It should be mentioned that during electrolyzer operation, the fuel cell hydrogen outlet 50 provided on the fuel cell end plate 80 is in closed position while the electrolyzer hydrogen outlet 51 is in an open position. Consequently, when hydrogen enters the flow fields 25 of the anode bipolar plates 21 from the hydrogen inlets thereof and spreads across the flow fields 25 (FIG. 5*b*), it will not flow via the outlets of the flow fields 25 adjacent the opposite end of anode bipolar plates 21 to the fuel cell hydrogen outlet 50. Although hydrogen may also flow across the flow field 25 to the said outlet, it is forced to flow along the channel formed by the inlets of the anode flow fields 25 to the electrolyzer hydrogen outlet 51 provided on the fuel cell end plate 80, which is the only passage available. The hydrogen then leaves the fuel cell portion 20 via the electrolyzer hydrogen outlet 51 and flows to the hydrogen storage means from which it is supplied to the fuel cells as a reactant during fuel cell operation. In this embodiment, as is known in the art, both the hydrogen port 41 on the separator plate 40 and the electrolyzer hydrogen outlet 51 on the fuel cell end plate 80 are in alignment with the hydrogen inlets of the flow fields 25 on the anode bipolar plates 21 of the fuel cells.

As is known in the art, hydrogen generated during electrolyzer operation carries water with it as it flows out of the electrolyzer portion. This water may flood fuel cells when it comes into the fuel cell portion and continuously flows across fuel cell anodes together with the hydrogen. However, in the present invention, almost all the hydrogen generated in electrolyzer operation flows directly to the electrolyzer hydrogen outlet 51 through the channel formed by the inlets of the anode flow fields 25. Although some hydrogen may also flow across the flow field 25 to fuel cell hydrogen outlet 50, since the flow passage is closed, the actual situation is some hydrogen is stagnant on the anode flow field 25 of the fuel cell portion. Therefore, flooding problem is easily avoided. Moreover, in case that the system switches from fuel cell mode to electrolyzer mode, the unconsumed hydrogen present in the anode flow filed 25 in the fuel cell portion 20 also helps to prevent the fuel cell portion 20 from being flooded.

When the regenerative fuel cell system is switching from the electrolyzer mode to the fuel cell mode, the presence of hydrogen in the fuel cell portion 20 from the generation of hydrogen in the electrolyzer portion 30 ensures an instantaneously available source of fuel for the fuel cell reaction and no purge period is needed. The heat generated in the electrolyzer reaction also keeps the stack in an elevated temperature. Therefore, the fuel cell is capable of instantaneous power output.

(3) Oxygen Flow

Figure 4C:
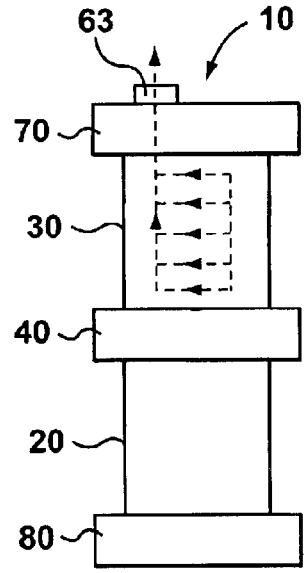
FIG. 4c is a schematic view, which illustrates the air oxygen flow in the regenerative fuel cell system according to the first embodiment of the present invention when the system runs in electrolyzer mode.

FIG. 4*c* illustrates the oxygen flow when the regenerative fuel cell system runs in the electrolyzer mode. As is known in the art, oxygen is the product of the electrolysis reaction. During electrolyzer operation, as water flows across the flow fields 35 of the electrolyzer cells, oxygen is generated on the anodes of the electrolyzer cells. The generated oxygen flows across the anode flow field 35 of each electrolyzer cell together with the unreacted water (FIG. 5*a*) and reaches the water outlet of the flow field 35 adjacent one end of each anode bipolar plate 31. Then the oxygen exits the flow fields 35 of the electrolyzer cells via the water outlets and leaves the electrolyzer portion 30 via the water outlet 63 provided on the electrolyzer end plate 70. The oxygen and water preferably goes to a liquid-gas separator (not shown) where the oxygen is separated from water, and the oxygen then goes to an oxygen storage means from which it can be supplied to the fuel cells during fuel cell operation. It should be mentioned that during the electrolyzer operation, the oxygen does not enter the fuel cell portion 20.

As will be understood by those skilled in the art, the fuel cell and electrolyzer portions 20, 30 of the present system are not necessarily arranged in the relation as disclosed in the first embodiment described above. However, the positioning of the electrolyzer portion 30 on top of the fuel cell portion renders a number of advantages. Firstly, when the regenerative fuel cell system is operating in fuel cell mode, water flows across the membrane to humidify the hydrogen in the electrolyzer portion 20. Any excess water tending to flood the hydrogen stream will be carried out the bottom of the stack by the hydrogen flow. In addition, water generated in the fuel cell portion in the fuel cell mode will be carried immediately out of the stack in a downward fashion to prevent water flooding in the fuel cells. Moreover, when the system is operating in electrolyzer mode, oxygen evolved at the anodes of the electrolyzer cells will naturally tend to flow upwards out of the water/oxygen outlet 63 on the electrolyzer end plate 70, preventing the trapping of $O_2$ gas in the stack.

Reference will now be made to FIGS. 5*a* and 5*b*, which show respectively the operation of the regenerative fuel cell apparatus of the present invention in a fuel cell mode and an electrolyzer mode. For simplicity and clarity, in FIG. 5, the fuel cell and electrolyzer portions 20, 30 are shown schematically, to indicate flows and to indicate flows between different sections of he apparatus. Additionally, in FIG. 5, the bipolar plates 21, 22 and 31, 32 are indicated, for one cell in each of the fuel cell portion 20 and the electrolyzer portion 30. Also, while the plates 21, 22, 31, 32 are indicated as being bipolar in the sense that, in general each plate will abut a plate of the opposite polarity in an adjacent cell, the plates, 21, 22, 31, 32 can more generally be considered as flow field plates.

To clarify the flow regime, the flows are shown passing directly between the individual anodes and cathodes of the cells shown. It will be understood that this is merely schematic. The actual physical construction is as shown in FIG. 2, with the various cells stacked together, and not side by side in the schematic representation of FIG. 5; rather, it is ducts extending through the fuel cell and electrolyzer portions 20, 30 that are in alignment with one another. These ducts are also perpendicular to the plane of the fuel cells.

It will also be understood that, in that manner, the fuel cells are configured to provide chambers between adjacent fuel cells, and also usually a corresponding chamber at the end of each stack. These chambers provide a gas bypass in the electrolyzer portion and are designated at 140; in a fuel cell portion, an exemplary chamber is indicated at 142, and provides a coolant channel for water as a coolant.

In the fuel cell mode of operation, water flows through the coolant chambers 142 and then into the anode of the electrolyzer portion, as indicated by the arrows 144. At the same time, air is supplied through the electrolyzer portion, passing through the gas bypass chamber 140 into the cathode of the fuel cell, as indicated by the arrows 146. Hydrogen is also passed through the electrolyzer portion 30. The hydrogen flows through the cathode of the electrolyzer portion and then into the anode of the fuel cell portion, as indicated by the arrows 148. Passing hydrogen and air, or other oxidant, through the electrolyzer portion 30 can enable some heat exchange to occur, as the electrolyzer portion 30 is heated by the cooling water exhausted from the fuel cell portion 20. Additionally, some humidification of the hydrogen stream can occur.

In the electrolyzer mode of operation, water again flows through the coolant chambers 142 and then through the electrolyzer cell anode as indicated by arrows 150. If desired, an air flow can be provided as indicated at 152 through the gas bypass chamber 140 and the fuel cell cathode, although this is not essential. As indicated at 154, due to electrolysis, water leaving the electrolyzer portion 30 contains entrained oxygen. Hydrogen is generated in the cathode of the electrolyzer portion. The hydrogen can be withdrawn from the electrolyzer portion in a number of different ways. As indicated by the arrow 156, the hydrogen can be taken out through the fuel cell portion; however, as indicated in FIG. 4b, this is preferably through a duct bypassing the actual flow fields of the fuel cell. Alternatively, as detailed below in relation to FIG. 8, hydrogen can be withdrawn from a side port in the separator plate 40, between the electrolyzer and fuel cell portions, as indicated schematically by the arrow 158. A further alternative is to take the hydrogen out from the top of the electrolyzer portion 30, indicated symbolically by the arrow 160; this is detailed below in relation to FIG. 9, and does require provision for draining water from the electrolyzer cathode.

Figure 6:
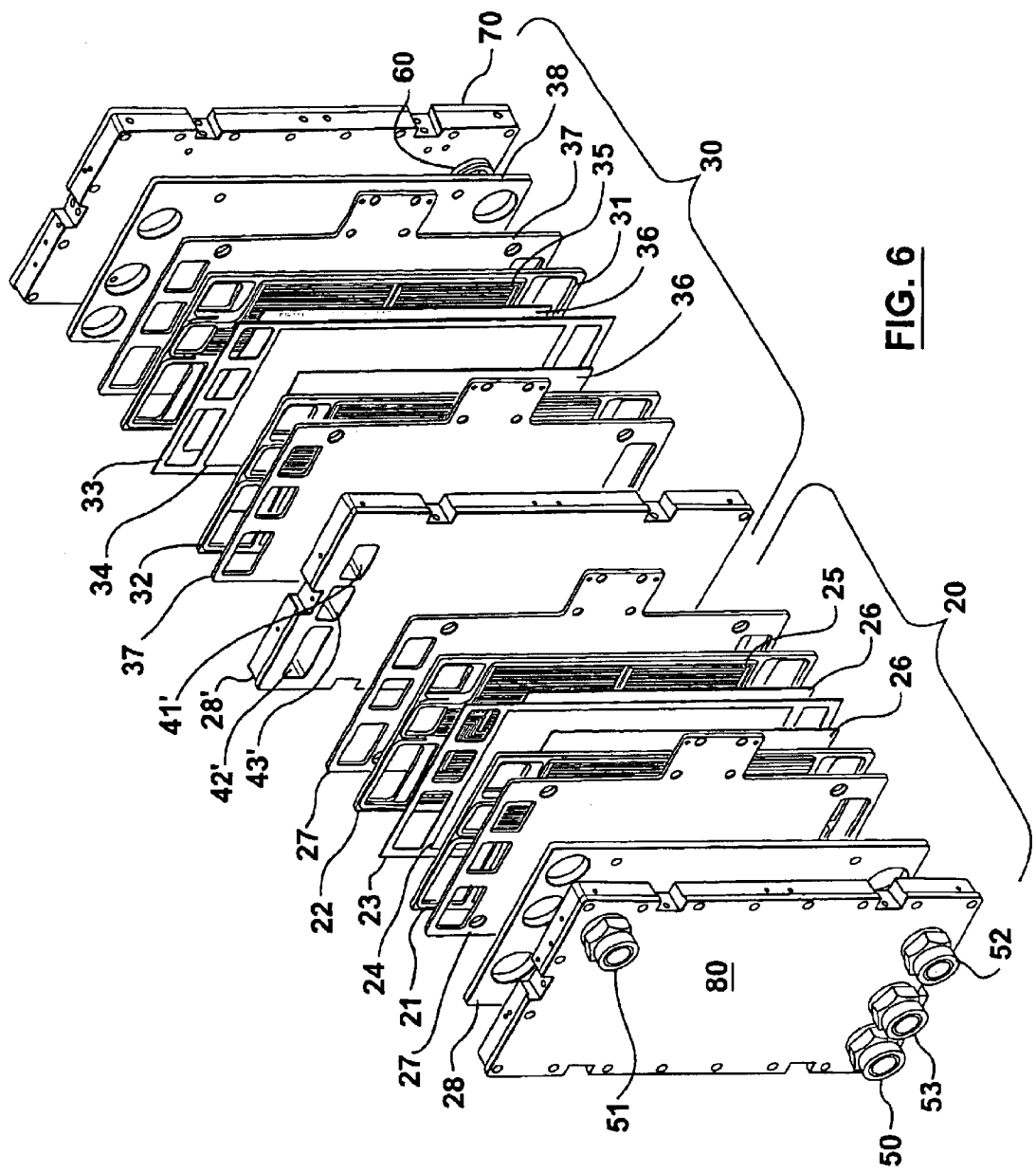
FIG. 6 is an exploded rear front perspective view, respectively, which illustrate a second embodiment of the regenerative fuel cell system according to the present invention.

Now referring to FIG. 6, a second embodiment of the present invention is shown. For simplicity, the elements in the system that are identical or similar to those in the first embodiment are indicated with same reference numbers and for brevity, the description of these elements is not repeated. In this embodiment, the separator plate 40 and the insulator plates of the electrolyzer and fuel cell portions that abut against the separator plate 40 are omitted. The fuel cell portion 20 and the electrolyzer portion 30 are stacked together with only one insulator plate 28' sandwiched between the two portions. The insulator plate 28' functions as both the separator plate and the insulator plate for both portions. The insulator plate 28' has three ports on it, i.e. the hydrogen port 41', the air port 42' and the water port 43', to communicate water and process gases between the two portions. The principle of operation in this embodiment is same as that in the first embodiment. Therefore, it is not described in detail herein. In this embodiment, the number of elements in the system is further reduced, and the fuel cell portion 20 and the electrolyzer portion 30 are clamped together as a single unit.

Figure 7:
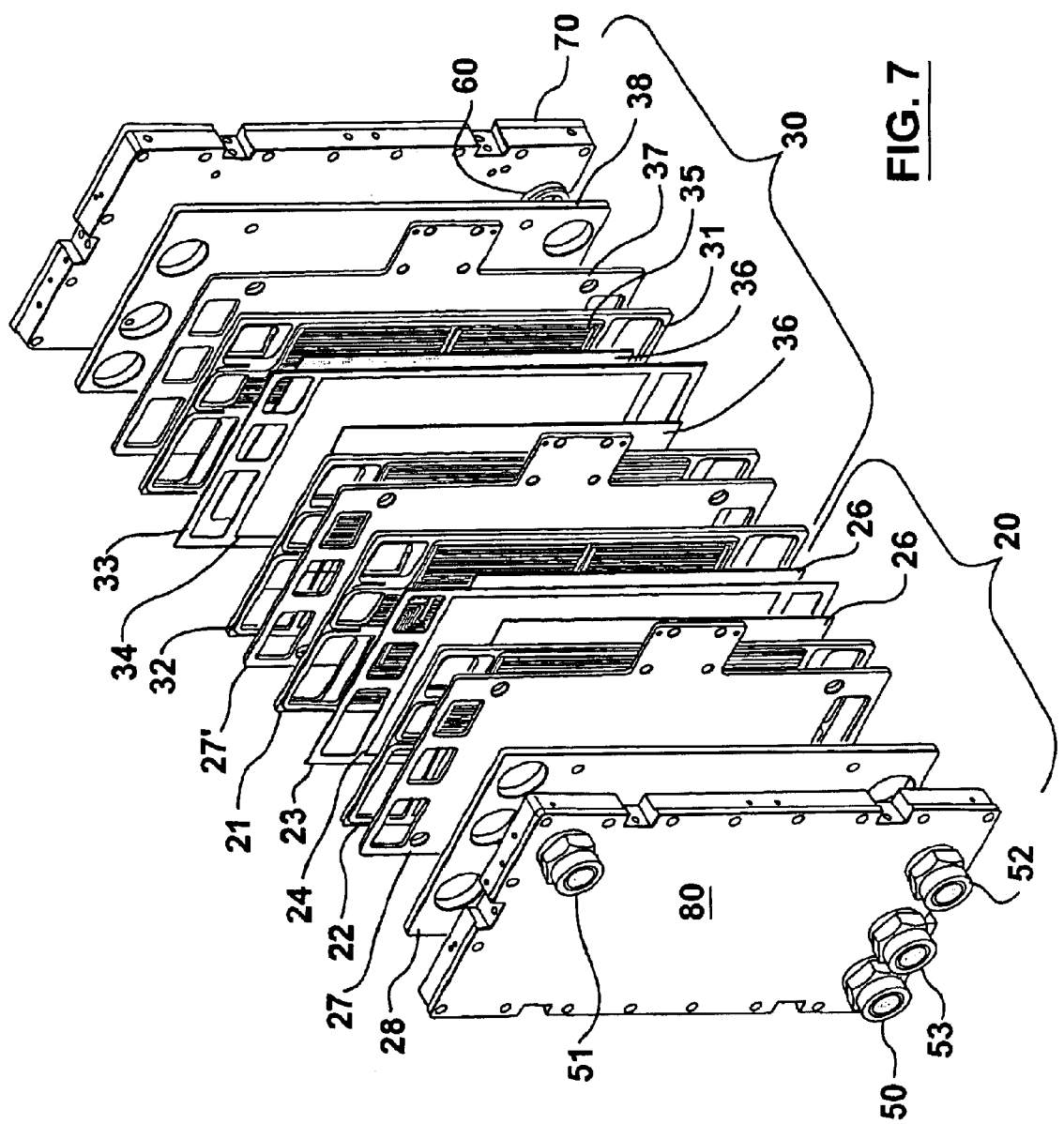
FIG. 7 is an exploded front perspective view, which illustrates a third embodiment of the regenerative fuel cell system according to the present invention.

Now, referring to FIG. 7, a third embodiment of the present invention is shown. As for FIG. 6, identical or similar elements are still indicated with same reference numbers and their description is not repeated. In this embodiment, compared with the first embodiment, the separator plate 40 and the two insulator plates 28, 38 are removed. As compared to FIG. 6, the central insulator plate 28 and separate current collector plates 27, 37 are also removed. Instead, a single, common current collector plate 27', interchangeable between the outermost fuel cell anode and the outermost electrolyzer cathode, is provided. Because the outermost anode of the fuel cells is the negative electrode in fuel cell stack and the outermost cathode of the electrolyzer cells is the negative electrode in electrolyzer cell portion, and further because the PEM in both electrolyzer cells and fuel cells are not electrically conductive, it is possible to electrically connect the anode of the fuel cell portion and the cathode of the electrolyzer portion and run the system in either mode. It is to be understood that in the first two embodiments above, the orientation of anode and cathode bipolar plates of either the fuel cells or the electrolyzer cells does not affect the feasibility of the present invention; however in this third embodiment, the fuel cell portion 20 and the electrolyzer portion 30 have to be disposed such that the current collector plate 27' is in contact with the anode bipolar plate 21 of a fuel cell on one side and the cathode bipolar plate 31 on the other side. Alternatively, as may be required in some applications, the anode of the fuel cell portion 20 and the cathode of the electrolyzer portion are both grounded. But this is not always required. In the same way as the separator plate 40, the common current collector plate 27' is provided with a hydrogen port, an air port and a water port to communicate fluids between the two portions. Accordingly, the size and weight of the regenerative fuel cell system is further reduced in this embodiment.

As another embodiment, the separator plate 40 in the first embodiment or the insulator plate 28' in the second embodiment is preferably provided with a valve, e.g. a ball valve 90 as shown in FIG. 8a and 8b, and this valve 90 can be internal within the separator plate 40. Here, the hydrogen port 41 is show having a first hydrogen port 41a in communication with the cathode outlets of the cathode flow fields 35 of the electrolyzer cells and a second hydrogen port 41b in communication with the anode inlets of the anode flow fields 25 of the fuel cells. Then, the all valve 90 is shown connected to first and second hydrogen ports 41a, 41b and also to a line 92 connected to a hydrogen storage tank. In the electrolyzer mode of the regenerative fuel cell system, the valve 90 may be in a first position to permit the electrolyzed hydrogen to flow from the electrolyzer portion 30, i.e. from the first hydrogen port 41, to an external hydrogen storage device. When the system switches from electrolyzer peration to fuel cell operation, the valve 90 switches to a second position, permitting hydrogen to flow between the first and second hydrogen ports 41a, b, i.e. to flow from the electrolyzer portion 30 to the fuel cell portion 20 in the same way described above. As known in the art, in the electrolyzer portion 30, water is carried across the membranes from the anode to the cathode during electrolysis, and is subsequently entrained in the cathode flow fields by the evolved hydrogen. This port arrangement prevents the water entrained in the generated hydrogen from entering the fuel cell portion 20 and hence flooding the fuel cells. Known separators and the like can be used to separate water out, upstream of a hydrogen storage tank or the like. As can be appreciated by those skilled in the art, the switch mechanism may alternatively be provided internally of the separator plate 40, namely in the hydrogen port 41.

Another way of prevent the fuel cell portion 20 from being flooded during electrolyzer mode to generate hydrogen is shown in FIG. 9. In this embodiment, hydrogen generated in the electrolyzer operation is exhausted out of the electrolyzer portion 30 from the port provided on the electrolyzer end plate 70. This port may be the port 60, or a port additional to the fuel cell hydrogen inlet 60, the air inlet 62 and the water outlet 63. The hydrogen is exhausted to an external storage device. As the electrolyzer reaction proceeds, water accumulates on the bottom of the electrolyzer portion 30. A purge valve 95 and a switch means, e.g. a ball valve 96 may be provided on the bottom part of the electrolyzer portion, in the embodiment, the separator plate 40 or insulator plate 28'. The purge valve 95 maybe disposed in the hydrogen port 41 and in communication with cathode outlets of the cathode flow field 35 of the electrolyzer cells. During electrolyzer operation of the system, the purge valve 95 and the ball valve 96 are in closed position, thereby closing the hydrogen passage between the electrolyzer portion 30 and the fuel cell portion 20. Periodically, the purge valve 95 is opened to purge the water out of the system to an external exhaust or water storage device. When the system switches from the electrolyzer operation to fuel cell operation, the purge valve 95 will be closed and the ball valve will switch to open position that allows hydrogen flows from the electrolyzer portion 30 to the fuel cell portion 20.

It should be appreciated that the spirit of the present invention is concerned with the novel structure of the regenerative fuel cell system and the unique usage of the electrolyzer as a humidifier and/or a heat exchanger for the fuel cell. The internal structure of the fuel cell portion and the electrolyzer portion does not affect the design of the present invention. In other words, the present invention is applicable to various types of fuel cells and electrolyzers. In applications where fuel gas is not pure hydrogen, reformers may be added before the inlet of the fuel gas for the fuel cell portion. In this case, the structure of the present system does not need to be changed.

It is to be anticipated that those having ordinary skill in this art can make various modification to the embodiments disclosed herein. For example, the shape of the fuel cells, electrolyzer cells or the entire system might be varied, the electrolyzer and the fuel cell portion might not necessarily be stacked one on top of the other. But rather they can be in juxtaposed position or even connected via conduits as needed in the situation. However, these modifications should be considered to fall under the protection scope of the invention as defined in the following claims.

What is claimed is:

1. A regenerative fuel cell apparatus comprising an electrolyzer portion and a fuel cell portion;
wherein the electrolyzer portion has a cathode including a first electrolyzer cathode port and a second electrolyzer cathode port, and an anode including a first electrolyzer anode port and a second electrolyzer anode port;
wherein the fuel cell portion comprises a fuel cell anode including a first fuel cell anode port and a second fuel cell anode port, a fuel cell cathode including a first fuel cell cathode port and a second fuel cell cathode port, and at least one coolant channel including a first coolant port and a second coolant port; and
wherein the regenerative fuel cell system includes at least one of:
(a) a connection between the second electrolyzer cathode port and the second fuel cell anode port, thereby to provide a continuous passage between the first electrolyzer cathode port and the first fuel cell anode port for hydrogen, through the electrolyzer cathode and the fuel cell anode,
(b) a connection between the second electrolyzer anode port and the second coolant port, thereby to provide a continuous passage between the first electrolyzer anode port and the first coolant port through the electrolyzer anode and said at least one coolant channel; and
(c) within the electrolyzer portion a gas bypass conduit including a first gas bypass port and a second gas bypass port, a connection between the second gas bypass port and the second fuel cell cathode port, thereby to provide a continuous passage between the first gas bypass port and the first fuel cell cathode port through bypass port conduit and the fuel cell cathode.

2. A regenerative fuel cell apparatus as claimed in claim 1, which includes both the connection between the second electrolyzer cathode port and the second fuel cell anode port, and the connection between the second electrolyzer anode port and the second coolant port.

3. A regenerative fuel cell apparatus as claimed in claim 2, which additionally includes the connection between the second gas bypass port and the second fuel cell cathode port, and the gas bypass conduit with the first and second gas bypass ports.

4. A regenerative fuel cell apparatus as claimed in claim 3, wherein the fuel cell portion and the electrolyzer portion are juxtaposed.

5. A regenerative fuel cell apparatus as claimed in claim 4, wherein the fuel cell portion and the electrolyzer portion are integral with one another, and wherein the fuel cell portion and the electrolyzer portion each include end plates, the end plates facing one another, wherein an end plate of the fuel cell portion adjacent an end plate of the electrolyzer portion includes said second ports.

6. A regenerative fuel cell apparatus as claimed in claim 5, which includes an insulator between said pair of adjacent end plates.

7. A regenerative fuel cell apparatus as claimed in claim 5, wherein the end plates of the fuel cell portion and the electrolyzer portion are integral and are provided as a common separator plate, including said second ports.

8. A regenerative fuel cell apparatus as claimed in claim 6 or 7, wherein the electrolyzer portion comprises a plurality of individual cells each including a membrane exchange assembly, an anode flow field plate and a cathode flow field plate, wherein the electrolyzer anode comprises said anode flow field plates and the electrolyzer cathode comprises said cathode flow field plates, and wherein the gas bypass conduit of the electrolyzer comprises a plurality of bypass conduits, each extending between an adjacent pair of electrolyzer cells.

9. A regenerative fuel cell apparatus as claimed in claim 8, wherein the fuel cell portion comprises a plurality of individual fuel cells, each comprising a membrane exchange assembly, an anode flow field plate and a cathode flow field plate, wherein the fuel cell anode comprises said anode flow field plates of the fuel cells and the fuel cell cathode comprises said cathode flow field plates of the fuel cells, and wherein said at least one coolant channel comprises a plurality of coolant channels provided between adjacent pairs of fuel cells.

10. A regenerative fuel cell apparatus as claimed in claim 9, wherein the electrolyzer portion is provided above the fuel cell portion.

11. A regenerative fuel cell apparatus as claimed in claim 9, wherein the fuel cell portion includes a third fuel cell anode port, and a conduit providing a direct passage between the second and third fuel cell anode ports, whereby, in use, in a fuel cell mode of operation, hydrogen gas passes between the first and second fuel cell anode ports and across the individual fuel cell anode flow field plates, and in an electrolyzer mode of operation, the generated hydrogen can pass between the first and third fuel cell anode ports.

12. A regenerative fuel cell apparatus as claimed in claim 4 or 5, wherein the first electrolyzer cathode port is closable, whereby in the electrolyzer mode of operation, hydrogen is withdrawn through the fuel cell portion.

13. A regenerative fuel cell apparatus as claimed in claim 11, wherein the first electrolyzer cathode port is closable, whereby in the electrolyzer mode of operation, hydrogen is withdrawn through the fuel cell portion.

14. A regenerative fuel cell apparatus as claimed in claim 4 or 5, wherein the first electrolyzer cathode port is adapted to withdraw hydrogen from the electrolyzer in the electrolyzer mode, and wherein means are provided for purging water from the cathode of the electrolyzer in the electrolyzer mode.

15. A regenerative fuel cell apparatus as claimed in claim 14, wherein said means for purging water comprises a purge valve connected to the second electrolyzer cathode port, whereby, in use, with the first electrolyzer cathode port oriented above the second electrolyzer cathode port, hydrogen is withdrawn from the first electrolyzer cathode port and water is purged from the electrolyzer cathode through said purge valve.

16. A regenerative fuel cell apparatus as claimed in claim 12, which includes a valve provided between the second electrolyzer cathode port and the second fuel cell anode port and wherein a discharge line for hydrogen is provided connected to the valve, whereby, in use, the valve connects the second electrolyzer cathode port to the second fuel cell anode port for supply of hydrogen to the fuel cell portion in the fuel cell mode, and, in an electrolyzer mode of operation, the valve connects the second electrolyzer cathode port to the discharge line, for discharging generate hydrogen and any entrained water.

17. A regenerative fuel cell apparatus comprising an electrolyzer portion and a fuel cell portion, wherein the electrolyzer port and the fuel cell portion are integral with one another, and wherein there is at least one passage for a fluid extending through both of the electrolyzer portion and the fuel cell portion and including one connection port on the electrolyzer portion and another connection port on the fuel cell portion.

18. A regenerative fuel cell apparatus as claimed in claim 17, wherein the electrolyzer portion and the fuel cell portion have similar cross-sections and include common clamping elements securing the regenerative fuel cell apparatus together.

19. A regenerative fuel cell apparatus as claimed in claim 18, wherein the electrolyzer portion comprises a plurality of individual cells each including a membrane exchange assembly, an anode flow field plate and a cathode flow field plate, wherein the anode flow field plates form an electrolyzer anode, the cathode flow field plates form an electrolyzer cathode, and wherein a plurality of gas by-pass conduits are provided extending between the individual cells.

20. A regenerative fuel cell apparatus as aimed in claim 19, wherein the fuel cell portion comprises a plurality of individual cells, each comprising a membrane exchange assembly, an anode flow field plate and a cathode flow field plate, wherein the anode flow field plates provide the fuel cell anode, the cathode flow field plates provide the fuel cell cathode and wherein a plurality of coolant channels are provided extending between adjacent pairs of fuel cells.

21. A regenerative fuel cell apparatus as claimed in claim 20, wherein the electrolyzer portion includes: a first electrolyzer cathode port for hydrogen, a second electrolyzer cathode port, a first electrolyzer anode port for water and, in the electrolyzer mode, water, a second electrolyzer anode port, a first gas by-pass port for an oxidant and a second gas by-pass port;

wherein the fuel cell portion includes a first fuel cell anode port for hydrogen and a second anode fuel cell port connected to the second electrolyzer cathode port, a first fuel cell cathode port for an oxidant and a second fuel cell cathode port connected to the second gas by-pass port, a first coolant port and a second coolant port connected to the second electrolyzer anode port, for passage of water as a coolant.

22. A method of operating a regenerative fuel cell apparatus including an electrolyzer portion and a fuel cell portion, the method comprising effecting, alternately:

a) in a fuel cell mode of operation, supplying hydrogen and an oxidant to the fuel cell to generate electricity, withdrawing water from the fuel cell and passing a coolant through the fuel cell, wherein the method includes passing at least one of the fuel gas, the oxidant and the water through the electrolyzer portion; and b) in an electrolyzer mode of operation, supplying water to the electrolyzer and electric current to electrolyzer water to generate oxygen and hydrogen and withdrawing oxygen, hydrogen and residual water from the electrolyzer, wherein the method includes passing at least one of the water, oxygen and hydrogen through the fuel cell portion.

23. A method as claimed in claim 22, which includes, in the fuel cell mode, passing water through the anode of the electrolyzer portion, to maintain the electrolyzer portion heated.

24. A method as claimed in claim 23, which includes, in the fuel cell mode, passing hydrogen for the fuel cell through the electrolyzer cathode, providing at least one gas by-pass conduit in the electrolyzer portion and passing oxidant for the fuel cell through said at least one gas by-pass conduit, whereby the oxidant and the hydrogen are preheated in the electrolyzer portion.

25. A method as claimed in claim 23, which includes, in the electrolyzer mode of operation, passing water through a coolant channel of the fuel cell portion and into the anode of the electrolyzer, withdrawing oxidant and residual water from the anode of the electrolyzer, and withdrawing hydrogen from the cathode of the electrolyzer.

26. A method as claimed in claim 25, which includes withdrawing hydrogen from the cathode of the electrolyzer through the anode of the fuel cell portion.

27. A method as claimed in claim 26, which includes withdrawing hydrogen through a conduit by-passing active areas of the fuel cell portion.

28. A method as claimed in claim 27, which includes, in the electrolyzer mode of operation, withdrawing hydrogen and entrained water from a port located between the electrolyzer and fuel cell portions and subsequently separating hydrogen from the water for storage.

* * * * *

UNITED STATES PATENT AND TRADEMARK OFFICE
CERTIFICATE OF CORRECTION

PATENT NO. : 6,833,207 B2
DATED : December 21, 2004
INVENTOR(S) : Nathanial Ian Joos, David Frank and Joseph Cargnelli It is certified that error appears in the above-identified patent and that said Letters Patent is hereby corrected as shown below:

Column 18,
Line 16, delete "through bypass port" and substitute -- through gas bypass --;

Column 19,
Line 43, delete "port" and substitute -- portion --;
Line 62, delete "aimed" and substitute -- claimed --; and Column 20,
Line 1, delete "elate" and substitute -- plate --.

Signed and Sealed this

Twenty-fourth Day of May, 2005

JON W. DUDAS
*Director of the United States Patent and Trademark Office*